United States Patent
Bacchus et al.

(10) Patent No.: US 7,222,247 B2
(45) Date of Patent: May 22, 2007

(54) MULTIPLE-MODE COMPUTER SLOT INITIALIZATION

(75) Inventors: Reza M. Bacchus, Spring, TX (US); Kenneth T. Brown, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 514 days.

(21) Appl. No.: 10/818,220

(22) Filed: Apr. 5, 2004

(65) Prior Publication Data

US 2005/0223246 A1    Oct. 6, 2005

(51) Int. Cl.
*G06F 1/00*    (2006.01)
*G06F 1/32*    (2006.01)

(52) U.S. Cl. ........................ 713/300; 713/320
(58) Field of Classification Search ............. None
See application file for complete search history.

(56) References Cited

U.S. PATENT DOCUMENTS 4,951,171 A * 8/1990 Tran et al. .................. 361/90

6,269,416 B1 * 7/2001 Meier et al. ................ 710/301
6,327,635 B1 * 12/2001 Alston et al. ............... 710/301

OTHER PUBLICATIONS

PCI-X Electrical and Mechanical Addendum, Rev. 2.0a, Sections 2.4 and 2.5.4.
PCI-X Protocol Addendum to the PCI Local Bus Specification, Rev. 2.0a, Sections 6.2 and 6.2.1.
PCI SIG News Release, PCI-X 2.0 Specification Doubles and Quadruples the Performance of PCI Bus Technology.

* cited by examiner

*Primary Examiner*—Rehana Perveen
*Assistant Examiner*—Stefan Stoynov

(57) ABSTRACT

A computer system determines whether a voltage signal that powers a slot circuitry and a card in one of two modes has been properly generated. If so, then the slot circuitry and the card are initialized in the one mode. Otherwise, the slot circuitry and the card are initialized in the other of the two modes.

13 Claims, 6 Drawing Sheets

MULTIPLE-MODE COMPUTER SLOT INITIALIZATION

BACKGROUND

The Peripheral Component Interconnect (PCI) specification, including the PCI-X Addendum, is a computer industry standard specification for the connection and operation of PCI-compatible computer cards, card slots and slot circuitry in a computer. The PCI-X specification began with a first version known as the PCI-X Addendum to the PCI Local Bus Specification Revision 1.0 (referred to herein as "the PCI-X 1.0 specification") and has evolved to a second version known as the PCI-X Addendum to the PCI Local Bus Specification Revision 2.0 (referred to herein as "the PCI-X 2.0 specification"). Among other changes, the PCI-X 2.0 specification introduced faster clocking rates (e.g. 266 MHz, 533 MHz, etc) and a lower signaling voltage (e.g. VI/O=1.5v) than that described in the PCI-X 1.0 specification (e.g. 66 MHz and 133 MHz clocking rates and VI/O=3.3v). The VI/O powers buffers that drive the high data rate signals between the card and the rest of the computer. The cards and slot circuitry that operate under the PCI-X 1.0 specification are referred to as "mode 1" devices. Similarly, the cards and slot circuitry that operate under the PCI-X 2.0 specification are referred to as "mode 2" devices. The PCI-X 2.0 specification also requires that all mode 2 cards and slot circuitry be backwardly compatible with mode 1 cards and slot circuitry. In other words, the mode 2 slot circuitry must be able to work with mode 1 cards inserted into the card slots, and the mode 2 cards must be able to work with mode 1 slot circuitry and card slots.

When a computer has both a mode 2 slot circuitry and a mode 2 card, but cannot operate in mode 2 (e.g. when the 1.5v VI/O is not properly generated), the computer nevertheless attempts to initialize the slot circuitry and card in mode 2. Afterwards, it is determined that the 1.5v VI/O has not been properly generated, so the slot circuitry and card are placed and held in reset. Thus, the slot circuitry is not operational and the card is not available to the computer. This situation may occur even though the card and slot circuitry could both potentially operate in mode 1. Additionally, this situation is highly undesirable in some applications wherein it is very important that the computer be operational, such as for a mission-critical database server or a point-of-sale server, among others.

DETAILED DESCRIPTION

Figure 1:
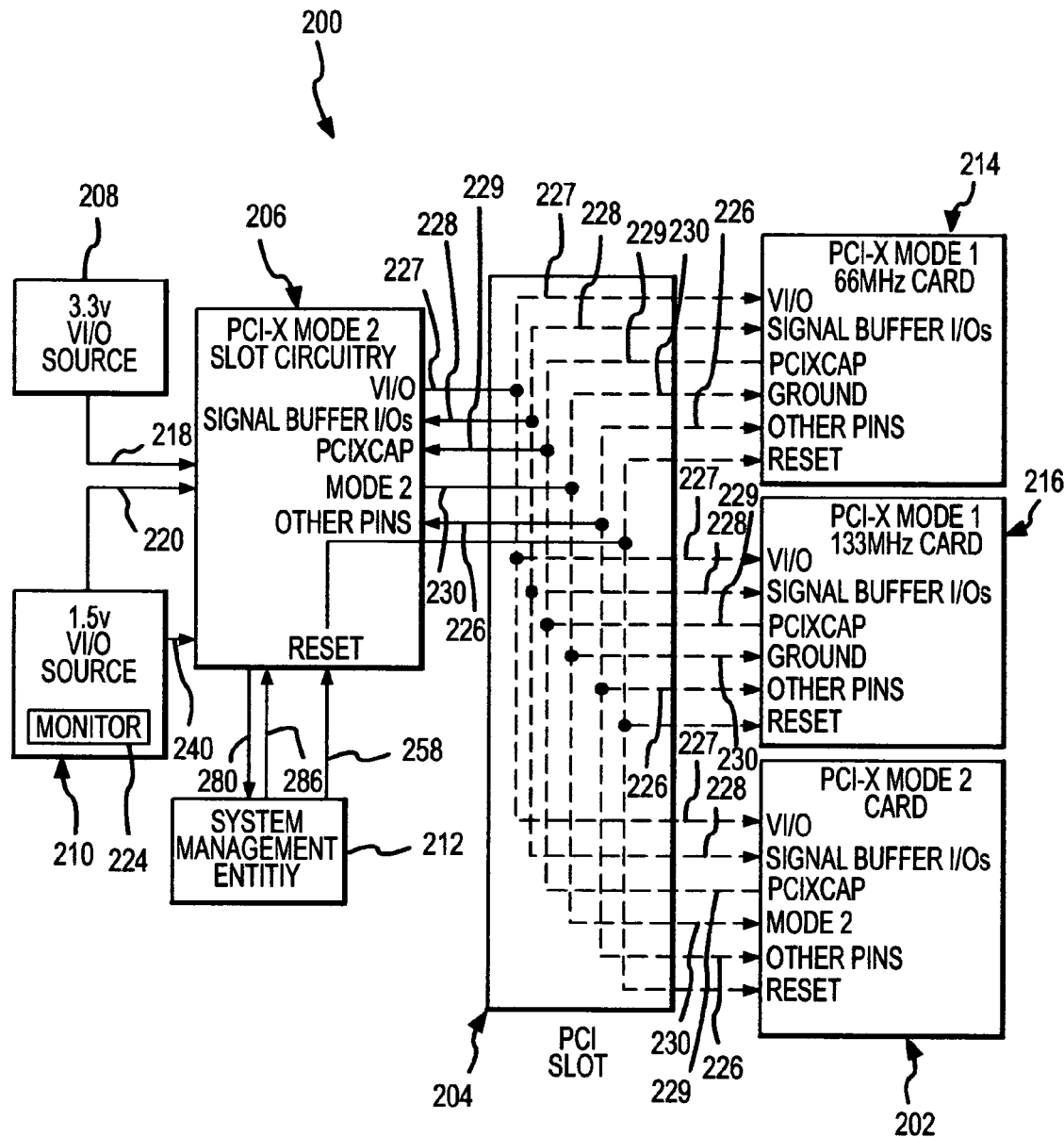
FIG. 1 is a simplified block diagram of a computer system according to an embodiment of the present invention.

A computer system 200 incorporating an embodiment of the present invention is shown in FIG. 1. According to this embodiment, the computer system 200 generally includes a PCI-X mode 2 card 202, a PCI-X mode 2 card slot ("PCI slot") 204, a PCI-X mode 2 slot circuitry 206, a 3.3v voltage source 208, a 1.5v voltage source 210 and a system management entity 212, such as a BIOS, among other components. A 66 MHz PCI-X mode 1 card 214 and a 133 MHz PCI-X mode 1 card 216 are also shown since the mode 2 slot circuitry 206 and card slot 204 are backwardly compatible with mode 1 cards. The cards 202, 214 and 216 are shown connected to the card slot 204 by dashed lines because only one card can be inserted in the card slot 204 at a time. Although the invention is described with reference to a computer system having PCI capability, it is understood that other embodiments of the invention may apply to computer systems having other capabilities, such as having other types of bus systems, non-bus environments, etc. In which cases, other appropriate circuitry than that described below may be used for the same general purposes described.

The 3.3v voltage source 208 supplies a 3.3v VI/O signal 218 (within an acceptable tolerance or range) to the slot circuitry 206 to power the slot circuitry 206 and the card inserted in the PCI Slot 204 in mode 1, e.g. when one of the mode 1 cards 214 or 216 is inserted in the card slot 204. The 1.5v voltage source 210 supplies a 1.5v VI/O signal 220 (within an acceptable tolerance or range) to the slot circuitry 206 to power the slot circuitry 206 and the mode 2 card 202 in mode 2 when the mode 2 card 202 is inserted in the card slot 204. According to an embodiment of the present invention, the 3.3v voltage source 208 also supplies the 3.3v VI/O signal 218 to the slot circuitry 206 to power the slot circuitry 206 and mode 2 card 202 in mode 1, even though the mode 2 card 202 is mode 2 capable, when the 1.5v voltage source 210 is unable to properly generate the 1.5v VI/O signal 220 within the acceptable tolerance or range. Additionally, although the embodiment is shown with only two voltage sources supplying specific voltage levels, it is understood that any number of voltage sources supplying any appropriate voltage level may be used.

Figure 2:
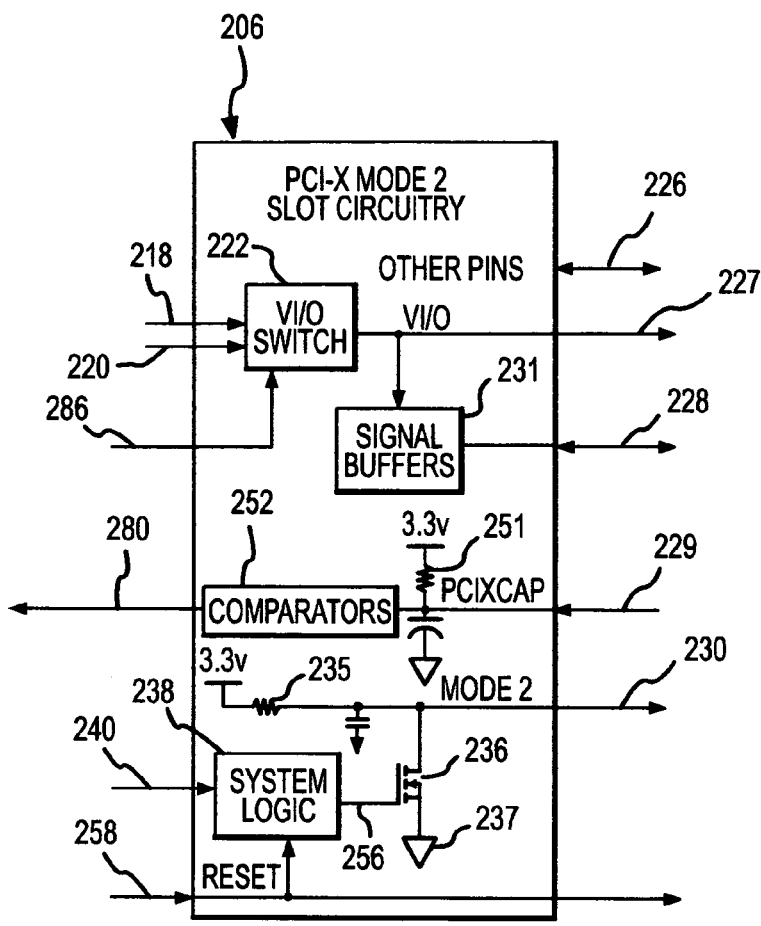
FIG. 2 is a simplified block diagram of a PCI-X mode 2 slot circuitry according to an embodiment of the present invention and incorporated in the computer system shown in FIG. 1.

The VI/O signal 218 or 220 that is supplied to the slot circuitry 206 is preferably selected by the system management entity 212, e.g. by selecting the VI/O through a VI/O switch 222 (as shown in FIG. 2), by disabling one of the VI/O signals 218 or 220, or by another appropriate technique. Additionally, a 1.5v VI/O monitor 224 is included in (as shown in FIG. 1), or separate from, the 1.5v voltage source 210 to monitor the 1.5v VI/O signal 220 to determine whether the 1.5v voltage source 210 properly generates the 1.5v VI/O signal 220.

The slot circuitry 206 is preferably an ASIC ("application specific integrated circuit") or may be incorporated in another appropriate component of the computer system 200.

Figure 4:
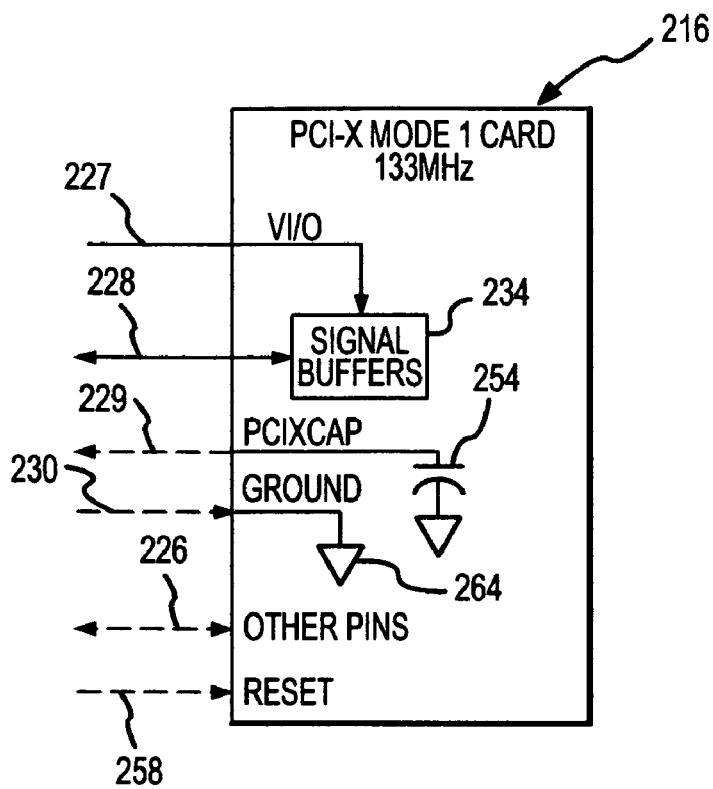
FIG. 4 is a simplified block diagram of a 133 MHz PCI-X mode 1 card according to an embodiment of the present invention and incorporated in the computer system shown in FIG. 1.
Figure 5:
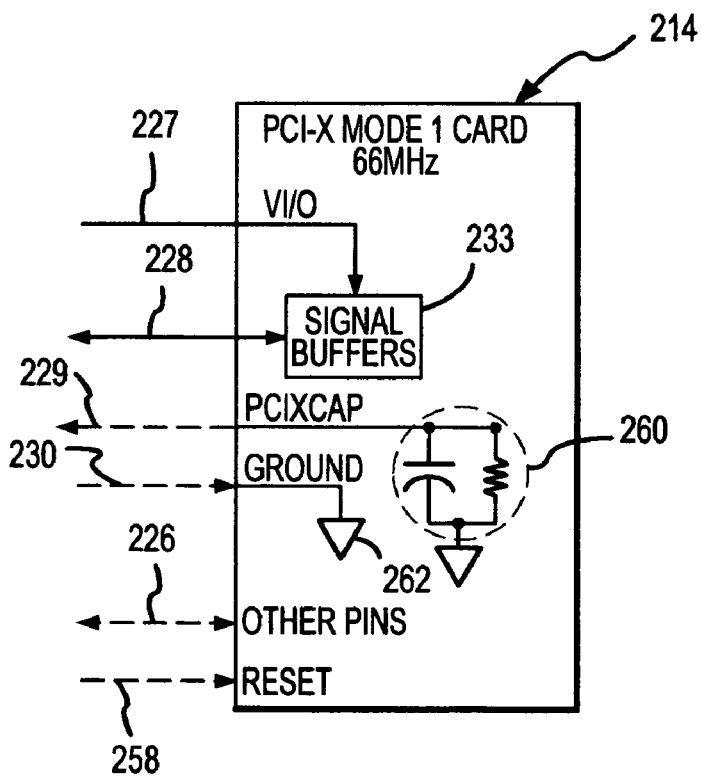
FIG. 5 is a simplified block diagram of a 66 MHz PCI-X mode 1 card according to an embodiment of the present invention and incorporated in the computer system shown in FIG. 1.

The slot circuitry 206 generally includes, among other pins 226, a VI/O signal 227, a plurality of signal buffer I/Os 228, a PCIXCAP signal 229 (an input) and a mode 2 signal 230 (an output). In other embodiments, other signals may be used for the general purposes described herein. The selected VI/O signal 218 or 220 is supplied through the VI/O signal 227 to signal buffers 231, as shown in FIG. 2, to generate the signal buffer I/Os 228 from the slot circuitry 206. The selected VI/O signal 218 or 220 is also supplied through the VI/O signal 227 to the card 202, 216 or 214 (FIGS. 3–5) to power signal buffers 232, 234 and 233, respectively, to generate the signal buffer I/Os 228 therein. The mode 2 signal 230, as shown in FIG. 2, is preferably connected through a pull-up resistor 235 to 3.3v and through a switch 236 (e.g. a transistor, etc.) to a ground 237. The switch 236 is operated by a system logic 238. The system logic 238 responds to a power-good signal 240 supplied from the 1.5v VI/O monitor 224 and which indicates whether the 1.5v voltage source 210 is properly generating the 1.5v VI/O signal 220 within an acceptable tolerance.

The computer system 200 preferably determines whether the 1.5v voltage source 210 is properly generating the 1.5v VI/O signal 220 before the slot circuitry 206 and the card 202 are initialized in mode 2. If the 1.5v voltage source 210 is not properly generating the 1.5v VI/O signal 220, then the slot circuitry 206 and the card 202 are initialized in mode 1, instead of mode 2. In other words, the computer system 200 "fails over" to mode 1 when the 1.5v voltage source 210 cannot power the slot circuitry 206 in mode 2. In this manner, the computer system 200 can operate with the card 202 fully available, albeit in a potentially less desirable mode, instead of having the card 202 completely unavailable.

Figure 3:
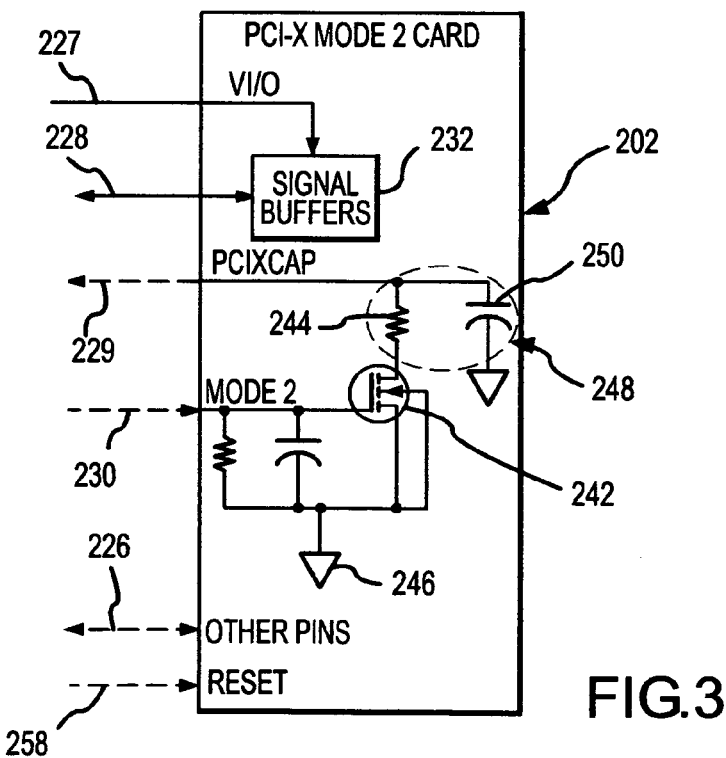
FIG. 3 is a simplified block diagram of a PCI-X mode 2 card according to an embodiment of the present invention and incorporated in the computer system shown in FIG. 1.

Under normal operating conditions (i.e. the 1.5v voltage source 210 has not failed), when connected to the slot circuitry 206, the card 202 receives the mode 2 signal 230 (i.e. the 3.3v connected through the pull-up resistor 235) from the slot circuitry 206. The voltage on the mode 2 signal 230 turns on a transistor 242 within the card 202 as shown in FIG. 3. The transistor 242 connects a pull-down resistor 244 to a ground 246. An RC circuit 248 (including the resistor 244 and a capacitor 250), in conjunction with a pull-up resistor 251 (FIG. 2) connected to the PCIXCAP signal 229 in the slot circuitry 206, establishes the PCIXCAP signal 229 as indicating that the card 202 is mode 2 capable. The PCIXCAP signal 229 is supplied to a set of comparators 252 (FIG. 2), which determine the voltage of the PCIXCAP signal 229, which in turn determines the mode capability of the card 202. Thus, after the system management entity 212 (FIG. 1) reads the mode capability determined by the comparators 252, the system management entity 212 initializes the slot circuitry 206 and card 202 in mode 2.

According to a particular embodiment, the computer system 200 preferably enables the fail-over by using a backward-compatible feature called for in the PCI-X 2.0 specification that enables a PCI-X mode 2 card to operate in a PCI-X mode 1 card slot with a PCI-X mode 1 slot circuitry. According to this feature, when the PCI-X mode 2 card 202 is connected to a PCI-X mode 1 slot circuitry, the card 202 receives a ground signal in place of the mode 2 signal 230. The ground signal turns off the transistor 242 (FIG. 3) in the card 202, so the ground 246 through the pull-down resistor 244 is isolated from the PCIXCAP signal 229. The capacitor 250 is similar to a capacitor 254 (shown in FIG. 4) connected to the PCIXCAP signal 229 in the 133 MHz PCI-X mode 1 card 216. Thus, the capacitor 250 in the card 202 establishes the PCIXCAP signal 229 as indicating that the card 202 is capable of the 133 MHz variation of mode 1, even though the card 202 is mode 2 capable. In this manner, when the system management entity reads the mode capability determined by the comparators in the PCI-X mode 1 slot circuitry to which the card 202 is connected, the system management entity initializes the card 202 (and the PCI-X mode 1 slot circuitry) in mode 1, instead of mode 2.

For the fail-over situation, the computer system 200 preferably uses the backward-compatible feature by connecting the mode 2 signal 230 to the ground 237 (FIG. 2) through the switch 236. The system logic 238 is preferably a logic circuitry that generates a signal 256 to open the switch 236 when the power-good signal 240 is received and to close the switch 236 when the power-good signal 240 is not received, or is negative. The system logic 238 also preferably coordinates the timing of the power-good signal 240 in relation to at least one reset signal 258 (supplied, for example, by the system management entity 212) in the computer system 200, so the fail-over can be completed before the slot circuitry 206 and the card 202 in slot 204 are released from reset.

When the 1.5v voltage source 210 (FIG. 1) does not properly generate the 1.5v VI/O signal 220, then the power-good signal 240 is negative, the system logic 238 closes the switch 236, and the mode 2 signal 230 is grounded. In this manner, the slot circuitry 206 appears to the card 202 as only mode 1 capable, since a mode 1 slot circuitry supplies a ground signal in place of the mode 2 signal 230. The grounded mode 2 signal 230, thus, turns off the transistor 242 (FIG. 3) in the card 202, as in the backward-compatible feature. The ground 246, through the pull-down resistor 244, is thus isolated from the PCIXCAP signal 229, so the capacitor 250 and pull-up resistor 251 (FIG. 2) establish the PCIXCAP signal 229 as indicating that the card 202 is capable of the 133 MHz variation of mode 1. The system management entity 212 (FIG. 1) is thus able to initialize the slot circuitry 206 and the card 202 in mode 1, even though both are intended to be mode 2 capable. In this manner, the card 202 is available, albeit in mode 1 instead of mode 2, for use by the computer system 200, even though the 1.5v voltage source 210 is not working properly.

The grounding of the mode 2 signal 230 does not affect the operation of the mode 1 cards 214 and 216, since the PCIXCAP signal 229 produced by the cards 214 and 216 are not dependent on the mode 2 signal 230. Instead, the PCIXCAP signal 229 produced by the card 216 is based on the capacitor 254 (FIG. 4) and the pull-up resistor 251 (FIG. 2), and the PCIXCAP signal 229 produced by the card 214 is based on an RC circuit 260 (FIG. 5, and different from the RC circuit 248 of card 202) and the pull-up resistor 251. Additionally, the mode 2 signal 230 is grounded by the mode 1 cards 214 and 216 at grounds 262 and 264, respectively.

Figure 6:
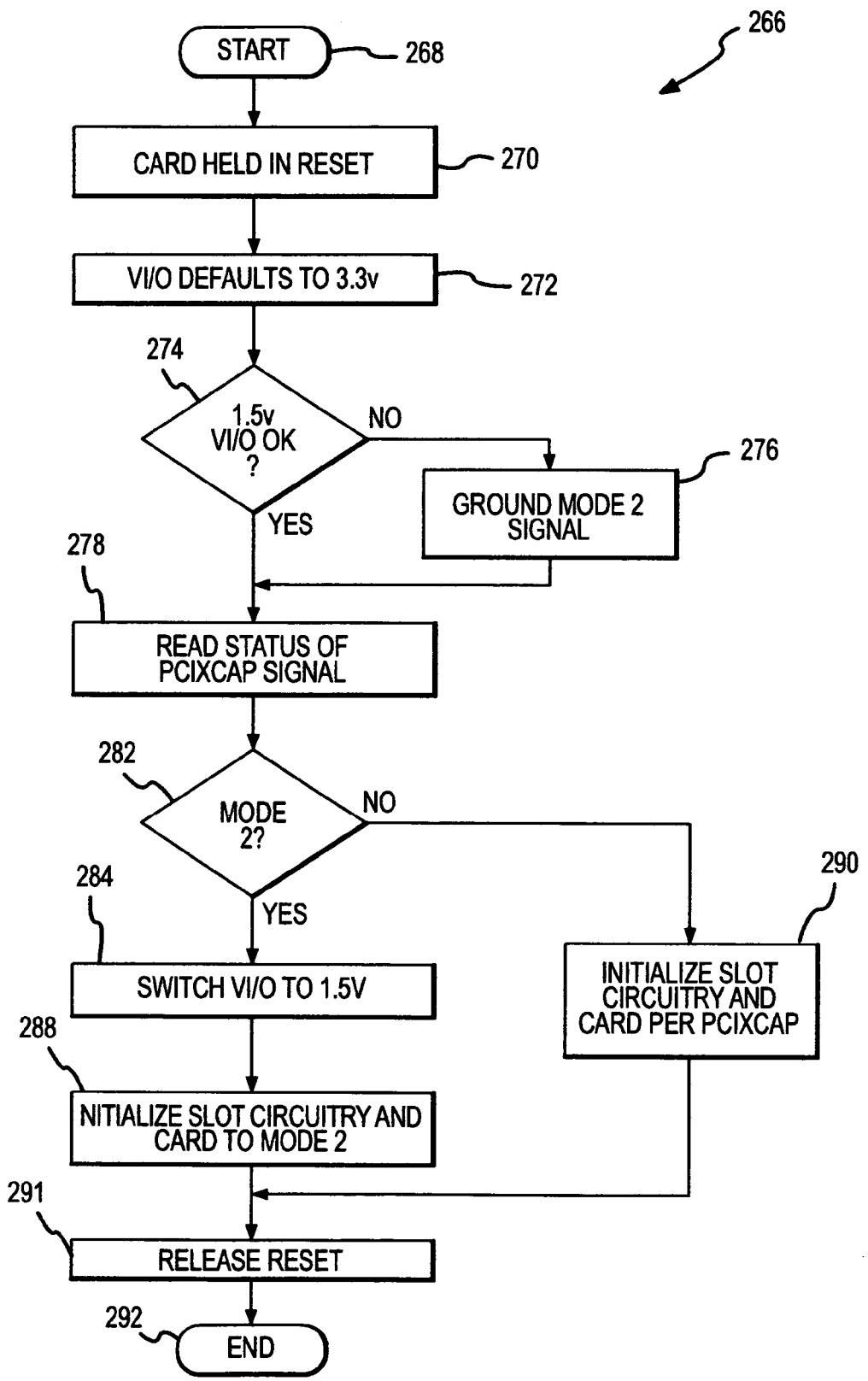
FIG. 6 is a simplified flow chart of a generalized procedure according to an embodiment of the present invention for initializing a PCI-X slot circuitry and card in the computer system shown in FIG. 1.

A simplified exemplary procedure 266 for initializing the slot circuitry 206 and the card 202 is shown in FIG. 6. The procedure 266 starts (at 268) at an appropriate point during configuration of the computer system 200 after power-up of the computer system 200. However, according to a particular embodiment, the procedure 266 may also be executed at any other appropriate time during the operation of the computer system 200. The card 202 is preferably held in reset (as indicated at 270) during at least part of the execution of the procedure 266 as determined by the reset signal 258 (FIGS. 1 and 2) received by the slot circuitry 206 and the card 202. The VI/O for the slot circuitry 206 and the card 202 initially defaults (at 272) to 3.3v. If the 1.5v VI/O signal 220 is properly generated, as indicated (at 274) by the power-good signal 240, then the PCIXCAP signal 229 is not affected and defaults to the mode 2 indication. On the other hand, if the 1.5v VI/O signal 220 is not properly generated, as indicated at 274, then the mode 2 signal 230 is grounded (at 276), which causes the PCIXCAP signal 229 to change to the mode 1 indication. The system management entity 212 reads (at 278) the status of the PCIXCAP signal 229 via a signal 280 (FIGS. 1 and 2) from the comparators 252 after the PCIXCAP signal 229 has had time to stabilize at either the mode 2 or mode 1 indication. Additionally, the PCIXCAP signal 229 preferably stabilizes before the reset is released. If the mode is determined (at 282) to be mode 2, then the system management entity switches (at 284) the VI/O to 1.5v by sending a switch signal 286 (FIGS. 1 and 2) to the VI/O switch 222 in the slot circuitry 206. The system management entity 212 initializes (at 288) the slot circuitry 206 and the card 202 to mode 2. On the other hand, if the mode is determined (at 282) not to be mode 2, then the system management entity 212 initializes (at 290) the slot circuitry 206 and card 202 to mode 1 according to the PCIXCAP signal 229. The slot circuitry 206 and the card 202 are released from reset (at 291). The procedure 266 ends at 292.

Figure 7:
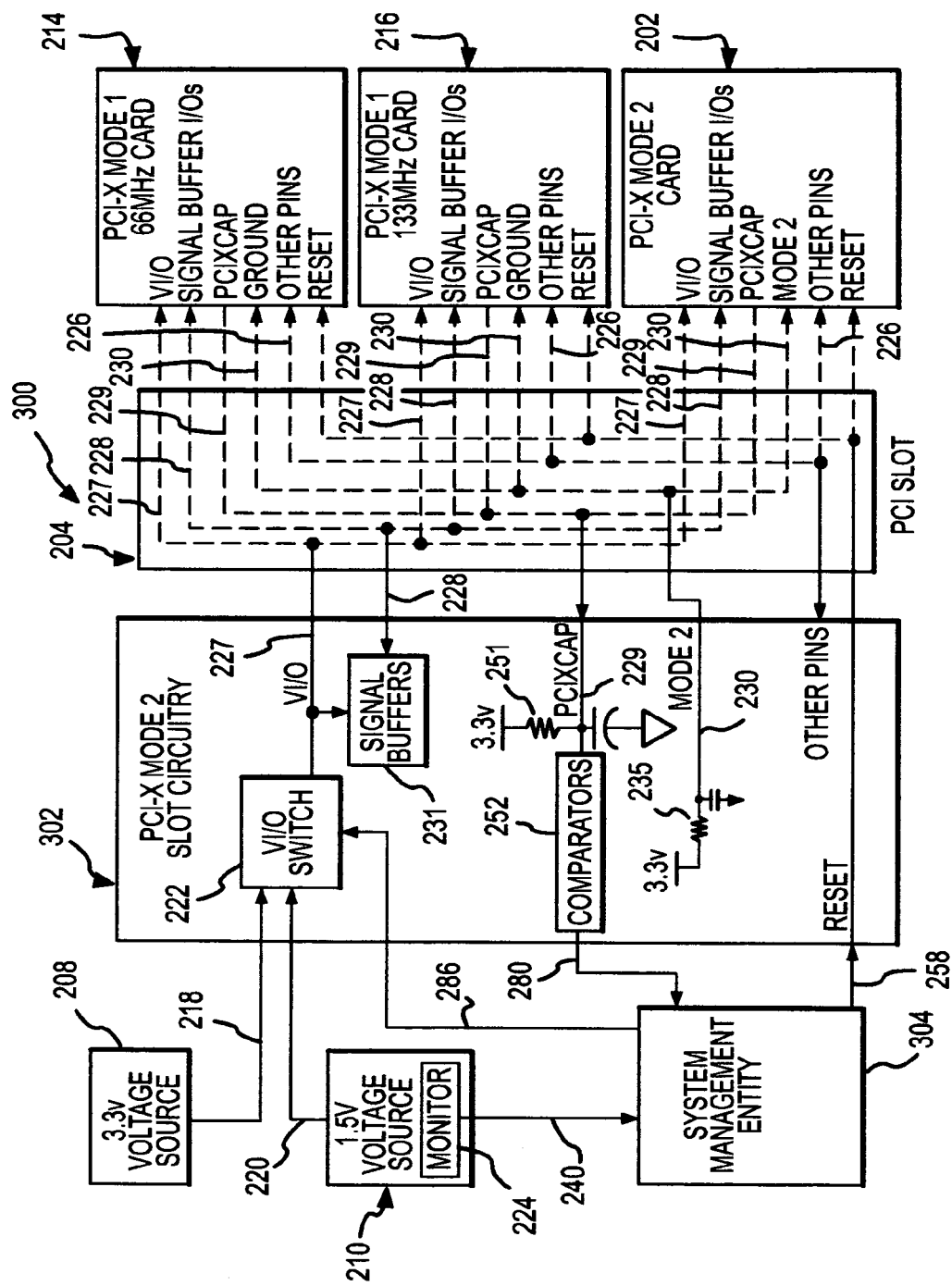
FIG. 7 is a simplified block diagram of a computer system according to an alternative embodiment of the present invention.

A computer system 300 incorporating an alternative embodiment of the present invention is shown in FIG. 7. According to this embodiment, the computer system 300 generally includes the PCI-X mode 2 card 202, the PCI-X mode 2 card slot 204, a PCI-X mode 2 slot circuitry 302, the 3.3v voltage source 208, the 1.5v voltage source 210 and a system management entity 304, such as a BIOS, among other components. The 66 MHz PCI-X mode 1 card 214 and the 133 MHz PCI-X mode 1 card 216 are also shown since the mode 2 slot circuitry 302 and the card slot 204 are backwardly compatible with mode 1 cards.

Similar to the computer system 200 (FIG. 1), the 3.3v voltage source 208 supplies the 3.3v VI/O signal 218 to the slot circuitry 302 to power the slot circuitry 302 and the card (e.g. one of the mode 1 cards 214 or 216) inserted in the card slot 204 in mode 1. Additionally, the 1.5v voltage source 210 supplies the 1.5v VI/O signal 220 to the slot circuitry 302 to power the slot circuitry 302 and the card 202 in mode 2. Furthermore, according to an embodiment of the present invention, the 3.3v voltage source 208 also supplies the 3.3v VI/O signal 218 to the slot circuitry 302 to power the slot circuitry 302 and the mode 2 card 202 in mode 1, even though the mode 2 card 202 is mode 2 capable, when the 1.5v voltage source 210 is unable to properly generate the 1.5v VI/O signal 220.

The VI/O signal 218 or 220 that is supplied to the slot circuitry 302 and the card inserted in card slot 204 is preferably selected by the system management entity 304, e.g. by sending the switch signal 286 to the VI/O switch 222 (as shown), by disabling one of the VI/O signals 218 or 220, or by another appropriate technique. Additionally, the 1.5v VI/O monitor 224 is included in (as shown), or separate from, the 1.5v voltage source 210 to monitor the 1.5v VI/O signal 220 to determine whether the 1.5v voltage source 210 is properly generating the 1.5v VI/O signal 220.

The slot circuitry 302 is preferably an ASIC or is incorporated in another appropriate component of the computer system 300. The slot circuitry 302 generally includes the other pins 226, the VI/O signal 227, the plurality of signal buffer I/Os 228, the PCIXCAP signal 229 and the mode 2 signal 230. In other embodiments, other signals may be used for the general purposes described herein. The selected VI/O signal 218 or 220 is supplied through the VI/O signal 227 to the signal buffers 231 to generate the signal buffer I/Os 228 from the slot circuitry 302. The selected VI/O signal 218 or 220 is also supplied through the VI/O signal 227 to the card 202, 216 or 214 (FIGS. 3–5) to power the signal buffers 232, 234 and 233, respectively, to generate the signal buffer I/Os 228 therein. The mode 2 signal 230 is connected through the pull-up resistor 235 to the 3.3v, but is preferably not connected to a ground in the manner of the computer system 200 (FIG. 1) and the slot circuitry 206 (FIGS. 1 and 2). Additionally, the power-good signal 240 is supplied from the 1.5v VI/O monitor 224 to the system management entity 304.

Similar to the computer system 200, the computer system 300 preferably determines whether the 1.5v voltage source 210 is properly generating the 1.5v VI/O signal 220 before the slot circuitry 302 and the card 202 are initialized in mode 2. If the 1.5v voltage source 210 is not properly generating the 1.5v VI/O signal 220, then the slot circuitry 302 and the card 202 are initialized in mode 1, instead of mode 2. In other words, the computer system 300 fails over to mode 1 when the 1.5v voltage source 210 cannot power the slot circuitry 302 in mode 2. In this manner, the computer system 300 can operate with the card 202 fully available, albeit in a potentially less desirable mode, instead of having the card 202 completely unavailable.

Under normal operating conditions (i.e. the 1.5v voltage source 210 has not failed), when connected to the slot circuitry 302, the card 202 receives the mode 2 signal 230 (i.e. the 3.3v connected through the pull-up resistor 235) from the slot circuitry 302. The voltage on the mode 2 signal 230 turns on the transistor 242 (FIG. 3) within the card 202. The transistor 242 connects the pull-down resistor 244 to the ground 246. The RC circuit 248 and the pull-up resistor 251 (FIG. 7) establish the PCIXCAP signal 229 as indicating that the card 202 is mode 2 capable. The PCIXCAP signal 229 is supplied to the set of comparators 252 (FIG. 7), which determine the value of the PCIXCAP signal 229, which in turn determines the mode capability of the card 202. Additionally, the system management entity 304 reads the power-good signal 240 to determine whether the slot circuitry 302 and the card 202 can be initialized in mode 2 regardless of the mode capability of the card 202. Thus, after the system management entity 304 (FIG. 7) reads the mode capability via the signal 280 from the comparators 252, the system management entity 304 initializes the slot circuitry 302 and card 202 in mode 2 only if the power-good signal 240 also indicates that the 1.5v voltage source 210 has not failed.

When the 1.5v voltage source 210 has failed to properly generate the 1.5v VI/O signal 220, the power-good signal 240 indicates this condition to the system management entity 304. In this situation, the system management entity 304, regardless of what the PCIXCAP signal 229 and/or any other mode-related signal indicate the mode capability of the card 202 to be, initializes the slot circuitry 302 and the card 202 in mode 1. In this manner, the computer system 300 avoids any problems associated with the failed 1.5v voltage source 210.

Figure 8:
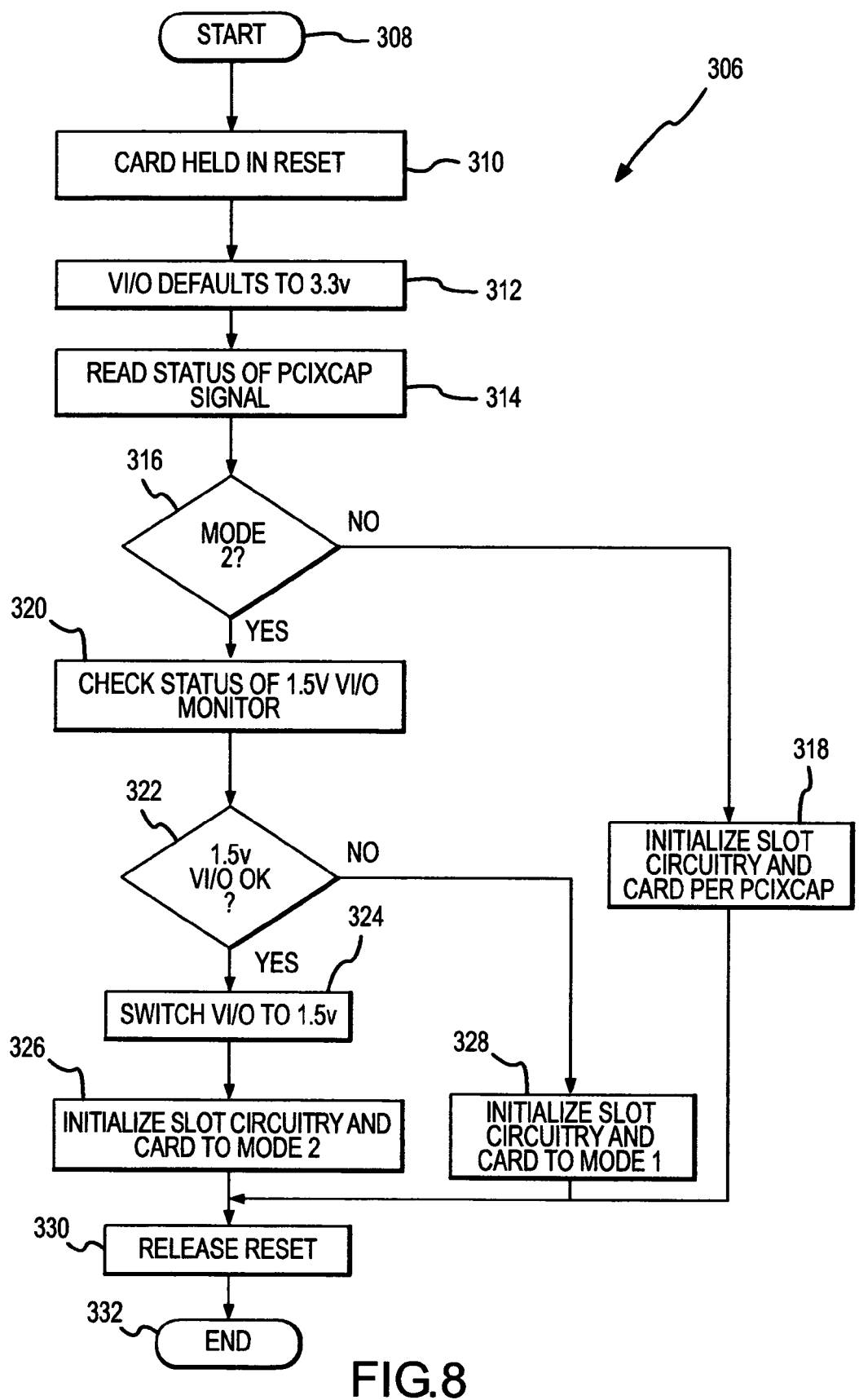
FIG. 8 is a simplified flow chart of a generalized procedure according to an embodiment of the present invention for initializing a PCI-X slot circuitry and card in the computer system shown in FIG. 7.

A simplified exemplary procedure 306 for initializing the slot circuitry 302 and the card 202 is shown in FIG. 8. The procedure 306 starts (at 308) at an appropriate point during configuration of the computer system 300 after power-up of the computer system 300. However, according to a particular embodiment, the procedure 306 may also be executed at any other appropriate time during the operation of the computer system 300. The card 202 is preferably held in reset (as indicated at 310) during at least part of the execution of the procedure 306 as determined by the reset signal 258 received by the slot circuitry 302 and the card 202. The VI/O for the slot circuitry 302 and the card 202 initially defaults (at 312) to 3.3v. The system management entity 304 reads (at 314) the status of the PCIXCAP signal 229 (and any other mode-related signals). It is determined (at 316) whether the mode indicated by the PCIXCAP signal 229 is mode 2. If not, then the status of the 1.5v VI/O signal 220 is irrelevant, so the system management entity 304 proceeds to initialize the slot circuitry 302 and the card 202 in a mode as determined by the PCIXCAP signal 229 and any other mode-related signals (at 318). On the other hand, if the mode indicated by the PCIXCAP signal 229 is mode 2, as determined at 316, then the system management entity 304 checks (at 320) the status of the 1.5v voltage source 210 by reading the power-good signal 240. If the 1.5v VI/O signal 220 is okay, according to the power-good signal 240, as determined at 322, the system management entity 304 preferably switches (at 324) the VI/O to 1.5v via the switch signal 286 (FIG. 7) to the VI/O switch 222. The system management entity 304 proceeds to initialize the slot circuitry 302 and the card 202 in mode 2 (at 326). On the other hand, if the 1.5v VI/O signal 220 is not okay, as determined at 322, the system management entity 304 proceeds to initialize the slot circuitry 302 and the card 202 in mode 1 (at 328). The system management entity 304 releases the slot circuitry 302 and card 202 from reset (at 330). The procedure 306 ends at 332.

We claim:

1. A computer system, comprising:
a card slot capable of holding a card inserted therein;
a slot circuitry connected to the card slot and capable of being initialized to operate in either one of a first operating mode and a second operating mode, the first operating mode using a first voltage and the second operating mode using a second voltage; and
a voltage source connected to the slot circuitry and intended to generate the second voltage;
and wherein:
when the voltage source does not generate the second voltage before the slot circuitry is initialized, the slot circuitry and the card are initialized to operate in the first operating mode; and
when the voltage source generates the second voltage before the slot circuitry is initialized, the slot circuitry and the card are initialized to operate in the second operating mode.

2. A computer system as defined in claim 1, wherein:
the slot circuitry comprises a PCI-X mode 2 circuitry.

3. A computer system as defined in claim 1, further comprising:
a logic circuit connected to the voltage source to receive an indication of whether the second voltage has been generated and connected to the slot circuitry to cause selection of one of the first operating mode and the second operating mode depending on whether the second voltage has been generated before the slot circuitry is initialized.

4. A computer system as defined in claim 3, further comprising:
a voltage monitor interposed between the voltage source and the logic circuit to generate and supply the indication of whether the second voltage has been generated before the slot circuitry is initialized.

5. A computer system as defined in claim 3, further comprising:
a reset signal supplied to the card and upon assertion of which holds the card in reset until released, at which point the slot circuitry and the card initialize in either one of the first operating mode and the second operating mode depending on the selection caused by the logic circuit.

6. A computer system as defined in claim 3, wherein:
when the logic circuit receives an indication that the second voltage has not been generated, the logic circuit causes a first-mode signal to be supplied from the slot circuitry to the card; and
when the logic circuit receives an indication that the voltage signal has been generated, the logic circuit causes a second-mode signal to be supplied from the slot circuitry to the card.

7. A computer system as defined in claim 6, wherein:
when the card receives the first-mode signal, the card supplies to the slot circuitry a signal indicating that the card is capable of operating in the first operating mode; and
when the card receives the second-mode signal, the card supplies to the slot circuitry a signal indicating that the card is capable of operating in the second operating mode.

8. A computer system as defined in claim 6, wherein:
the first-mode signal comprises a ground signal.

9. A computer system as defined in claim 6, wherein:
the second-mode signal comprises a PCI-X mode 2 pin signal.

10. A computer system as defined in claim 1, further comprising:
a system management entity capable of exchanging signals with the voltage source to receive an indication of whether the second voltage has been generated and capable of exchanging signals with the slot circuitry to cause selection of one of the first operating mode and the second operating mode depending on whether the second voltage has been generated before the slot circuitry is initialized.

11. A computer system as defined in claim 10, wherein:
when the system management entity receives an indication that the second voltage has not been generated, the system management entity initializes the slot circuitry in the first operating mode; and
when the system management entity receives an indication that the second voltage has been generated, the system management entity initializes the slot circuitry in the second operating mode.

12. A system logic for enabling operation of a card inserted in a computer system having a slot circuitry for communicating with the card in either one of a first operating mode and a second operating mode, the first operating mode using a first voltage and the second operating mode using a second voltage, comprising:
an input at which an indication signal is received from a voltage monitor, the indication signal indicating, prior to initialization of the slot circuitry and the card, whether the second voltage has been generated in the computer system;
an output connected to a mode signal of the slot circuitry, the mode signal indicating to the card either one of the first operating mode and the second operating mode that the slot circuitry supports; and
logic circuitry interposed between the input and the output to receive the indication signal, to allow the mode signal to indicate that the slot circuitry supports the second operating mode when the indication signal indicates that the second voltage has been generated and to cause the mode signal to indicate that the slot circuitry supports the first operating mode when the indication signal indicates that the second voltage has not been generated.

13. A system logic as defined in claim 12, further comprising:
 a switch connected to the logic circuitry and connected between the mode signal and a ground;
 and wherein:
 when the indication signal indicates that the second voltage has been generated, the logic circuitry holds the switch open; and
 when the indication signal indicates that the second voltage has not been generated, the logic circuitry holds the switch closed to ground the mode signal.

* * * * *